United States Patent [19]

Schmidt

[11] 4,039,977

[45] Aug. 2, 1977

[54] ADJUSTABLE COMPENSATING CIRCUIT HAVING DIFFERENTIAL CAPACITOR IN EACH TUNABLE STAGE

[75] Inventor: Hans-Joachim Schmidt, Nurnberg, Germany

[73] Assignee: Tekade Felten & Guilleaume Fernmeldeanlagen GmbH, Nuremberg, Germany

[21] Appl. No.: 706,838

[22] Filed: July 19, 1976

[30] Foreign Application Priority Data

July 26, 1975 Germany .............................. 2533553

[51] Int. Cl.² .............................................. H03H 7/16
[52] U.S. Cl. .................................. 333/28 R; 333/28 T
[58] Field of Search ........................... 333/28 R, 28 T; 179/1 D

[56] References Cited

U.S. PATENT DOCUMENTS

| 2,229,043 | 1/1941 | Butter | 333/28 R X |
| 3,750,052 | 7/1973 | Hermanutz | 333/28 R |

Primary Examiner—Paul L. Gensler
Attorney, Agent, or Firm—Michael J. Striker

[57] ABSTRACT

A compensating circuit has a frequency response curve into which can be introduced elevations or depressions of selected breadth at selected frequencies. The compensating circuit includes a plurality of tunable circuit stages associated with different frequency ranges. Each tunable circuit stage includes a resistor and an inductor connected in series with each other and to the rotor terminal of a differential capacitor having two stator terminals. The first stator terminals of the differential capacitors are connected to the first winding or windings of one or more differential transformers, while the second stator terminals of the differential capacitors are connected to the second winding or windings of the one or more differential transformers. The voltage induced across the one or more differential transformers is then employed to supplement the voltage which is being transmitted to the output resistor of the compensating circuit by the input transformer of the compensating circuit.

9 Claims, 5 Drawing Figures

ADJUSTABLE COMPENSATING CIRCUIT HAVING DIFFERENTIAL CAPACITOR IN EACH TUNABLE STAGE

BACKGROUND OF THE INVENTION

The invention relates to compensating circuits of the type used to compensate for lack of flatness in the frequency response of signal transmission circuitry. The compensating circuits of the type in question exhibit a frequency response curve (a curve of gain or attenuation plotted against frequency) into which can be introduced elevations or depressions of selected magnitude at selected frequency ranges. Usually, it is possible to select both the middle frequency and bandwidth of each elevation or depression to be introduced into the frequency response curve of the compensating circuit and also the magnitude of the elevation or depression to be introduced into the curve. Although such compensating circuits are in general utilized to compensate for lack of flatness in the frequency response of a transmission path, they may in certain circumstances also be used to accentuate or deaccentuate the transmission of certain spectral components of transmitted signals, for example to suit the taste of the listener of a phonographic sound system.

Many compensating circuits of the general type in question are already known, for example in Federal Republic of Germany Pat. Nos. 828,258 and 828,715 and Auslegeschriften No. 1,261,553 and 1,267,261. However, in all of these known circuits, it is necessary to use either multicontact switches or else potentiometers for effecting at least one of the three requisite adjustments (i.e., of the middle frequency of the elevation or depression to be introduced into the frequency response curve, of the bandwidth of the elevation or depression to be introduced, and of the magnitude of the elevation or depression to be introduced). Multicontact switches and potentiometers are in general disadvantageous because they are very susceptible to malfunction and also can result in considerable power losses.

Federal Republic of Germany Auslegeschrift No. 2,135,204 discloses an arrangement for equalizing broad band communications signals. In that arrangement, adjustable compensating components of various types, such as pilot stages, reasonance circuits, echo compensators and switchable attenuation stages, are connected parallel to one another in the transmission path for the communications signals, intermediate a circuit branch point and a summing junction; a permanently wired circuit branch serving as the main transmission path is provided with attenuation stages and is connected in parallel to the compensating signal transmission paths. This known circuit in part avoids the aforementioned difficulties; what is involved really is an arrangement for connecting together a plurality of two-terminal-pair compensating stages. The differential capacitors employed for summing the several compensating signals which are generated are connected as high-impedance components to the outputs of the two-terminal-pair stages and do not form components of resonant circuits.

Additionally, this known arrangement includes at least one amplifier at the input to which the signal level is quite low, so that the signal-to-noise ratio of the compensating arrangement is not good.

SUMMARY OF THE INVENTION

It is one general object of the invention to provide a compensating circuit of the type in question in which it is possible to adjust both the magnitude and frequency locations of the elevations and depressions to be introduced into the frequency response curve by means not involving multicontact switch devices, potentiometers, and the like.

It is another object to provide such a compensating circuit wherein the base attenuation — i.e., the attenuation produced by the circuit when no elevations or depressions have been introduced into its frequency response curve — is low, so that active intermediate stages are unnecessary.

It is a further object to provide a compensating circuit of such a configuration as to make it no longer absolutely necessary that the signal source have a low internal resistance.

It is another object to devise a circuit configuration for the compensating circuit such that the input impedance of the circuit in the range of frequencies of the signals to be transmitted is almost entirely real.

It is yet a further object to devise a configuration for the compensating circuit such that the individual tunable circuits which each introduce one elevation or depression into the frequency response curve are so greatly decoupled from one another that interfering secondary resonance effects are precluded.

These objects, and others which will become clearer from the detailed description, below, of preferred embodiments, can be met, according to one advantageous concept of the invention, by utilizing for the introduction of the plurality of elevations or depressions into the frequency response curve of the compensating circuit a plurality of tunable circuit states each comprised of a resistor and an inductor connected in series with each other and to the rotor terminal of a differential capacitor having first and second stator terminals. The current flowing through the rotor terminal of the differential capacitor of each tunable circuit stage splits and passes as two components through the two stator terminals of the differential capacitor. These two stator terminal currents are then fed through the opposing windings of a differential transformer, and the voltage induced across the differential transformer is utilized in the generation of a compensating signal applied to the output impedance of the compensating circuit. Alternatively, a plurality of differential transformers can be employed, with the two stator terminal currents of each tunable circuit stage being fed into the two opposing windings of the associated one of the differential transformers. In that event, means are provided for combining voltages derived from those induced across the plurality of differential transformers to form the aforementioned compensating signal.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
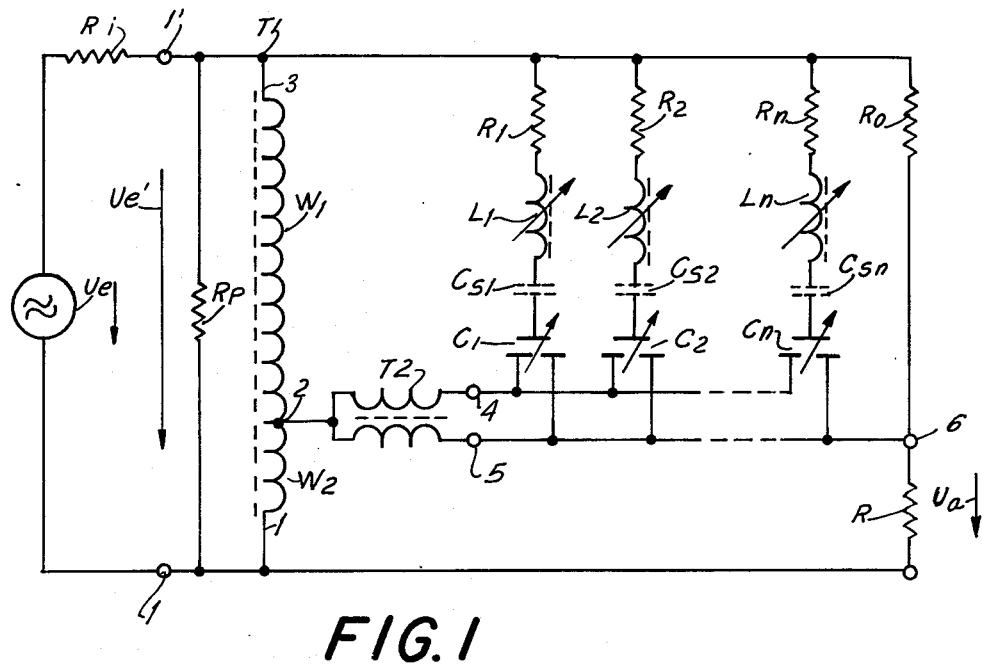
FIGS. 1-5 depict five exemplary embodiments of the present invention.

In the embodiment of FIG. 1, an input signal voltage $U_e'$ is generated by a signal source $U_e$ having an internal resistance $R_i$. The input signal $U_e'$ is applied across the input terminals 1, 1'. Connected across input terminals 1, 1' is an input transformer T1 having end terminals 1 and 3 and a tap 2. Also connected across input terminals 1, 1' is a voltage divider composed of resistors R and $R_o$. The turns ratio $W_1/W_2$ of the two sections of input transformer T1 is equal to the ratio $R_o/R$ of the two voltage divider resistors. The voltage drop $U_a$ across resistor R constitutes the output voltage of the circuit.

Additionally connected to input terminal 1' is a plurality of tunable circuit stages each consisting of the series connection of a resistor $R_x$, an inductor $L_x$ and a differential capacitor $C_x$. The rotor terminal of each differential capacitor $C_x$ is connected to one terminal of the associated inductor $L_x$. (The subscript $x$ is the generic subscript for the successive subscripts 1 to $n$.) The left stator terminals (as viewed in FIG. 1) of the differential capacitors $C_x$ are connected in common to one terminal 4 of a differential transformer T2. The right stator terminals (as viewed in FIG. 1) of the differential capacitors $C_x$ are connected in common to the other terminal 5 of differential transformer T2 and in common to one output terminal 6 of the circuit. The center tap of differential transformer T2 is connected to the tap 2 of the input transformer T1.

When the differential capacitors $C_x$ are each in their middle or balanced setting, the current flowing through each series connection $R_x$, $L_x$ divides into two equal components each passing through one of the two stator terminals of the differential capacitor and through the respective one of the two opposing windings of differential transformer T2. The flux resulting from the current flow through one of the two windings of the differential transformer T2 is cancelled out by the flux resulting from the current flow through the other of the two windings of the differential transformer T2. Accordingly, no voltage is induced across terminals 2, 4 or across terminals 2, 5.

The voltage attentuation of the circuit when the differential capacitors $C_x$ are thusly in their balanced settings is given by the equation $$20 \log U_e'/U_a = 20 \log (1 + R_o/R).$$

As can be seen from the equation, the voltage attenuation in this situation is independent of frequency.

If one of the differential capacitors $C_x$ is adjusted so as to no longer be in its balanced setting, then the current flowing through the rotor terminal of the capacitor is divided into two unequal components each flowing through a respective one of the two stator terminals of the capacitor. As a result, the magnetizing currents flowing in the two windings of differential transformer T2 will not longer be equal, and a non-zero voltage will be induced across terminals 2, 5. The voltage induced across terminals 2, 5, depending upon its polarity, will effect an increase or decrease of the current flowing through output resistor R. This current increase or decrease is frequency dependent and has a magnitude dependent upon the circuit values of components $R_x$, $L_x$ and $C_x$. This frequency dependent current increase or decrease is reflected in an elevation or depression in the curve representing the frequency dependence of the transfer function of the compensating circuit, i.e., in the frequency response curve of the compensating circuit. Because the sum of the two component currents flowing through any one of the differential capacitors $C_x$ is constant irrespective of the setting of the rotor of the capacitor, adjustment of the differential capacitor $C_x$ can be employed to adjust the magnitude of the frequency response curve elevation or depression without changing the center frequency of such dip or peak.

By adjusting the inductance of one of the adjustable inductors $L_x$, it is possible to shift the center frequency of the associated elevation or depression in the frequency response curve. The maximum magnitude of the elevation or depression which can be produced in the frequency response curve by any one of the tunable stages $R_x$, $L_x$, $C_x$ is principally determined by the resistance of the respective resistor $R_x$.

The effective resistance seen across the terminals 4, 5 of the $n$ tunable stages $R_x$, $L_x$, $C_x$ is that of the parallel combination of the resistances of resistors R and $R_o$. By making $R_x$ large compared to R, for example at least one order of magnitude (ten times) as great, the elevation- or depresion-producing current flowing through the resistor $R_x$ of each individual stage $R_x$, $L_x$, $C_x$ can be decoupled from i.e., made substantially independent of, the elevation- or depression-producing currents flowing through the resistors $R_x$ of the other stages $R_x$, $L_x$, $C_x$.

the input resistance of the compensating circuit of FIG. 1 is constituted by the sum of the resistance of resistors $R_o$ and R, plus the resistance of each resistor $R_x$ which is effective only over a relatively narrow respective frequency range and within such range is to be considered connected in parallel to the resistor $R_o$. Accordingly, the input resistance of the compensating circuit fluctuates only slightly about a central value. Furthermore, by providing an additional load resistor $R_p$ of suitable resistance value, it becomes possible to match the input resistance of the compensating circuit to the internal resistance $R_i$ of the signal source. In the embodiment of FIG. 1, this additional load resistor $R_p$ is connected directly across the input terminals 1, 1'.

Figure 2:
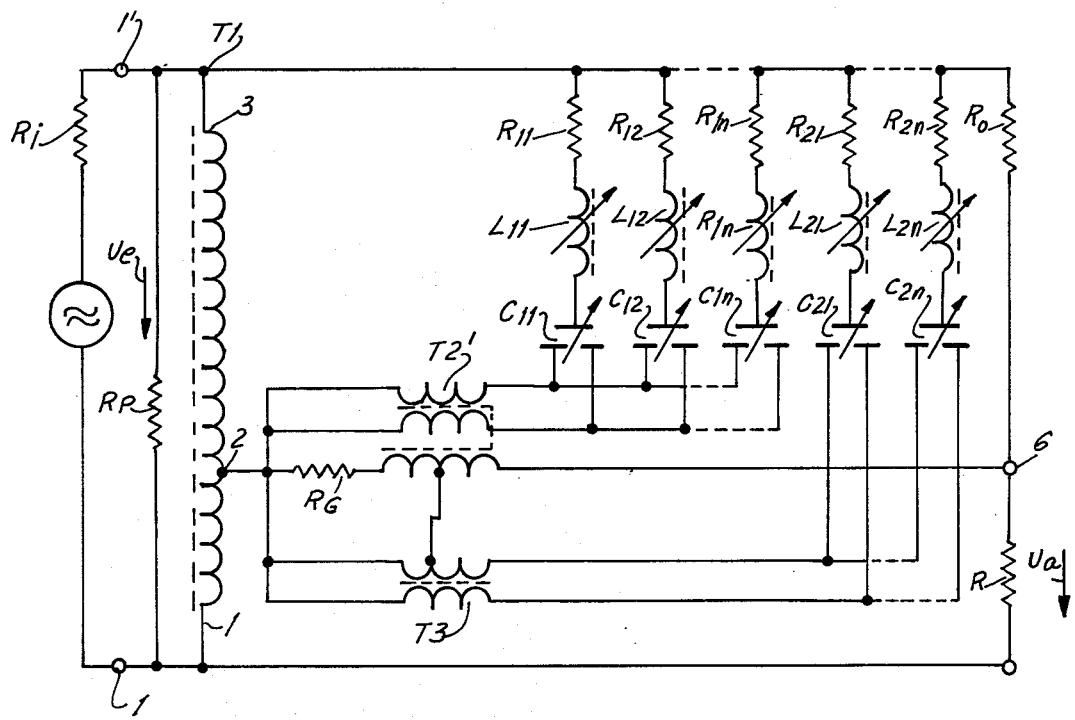

The embodiment of FIG. 1 is a modified version of that of FIG. 2. In the compensating circuit depicted in FIG. 2, there are provided two differential transformers T2' and T3 in correspondence to the provision of two groups of tunable stages $R_{1x}$, $L_{1x}$, $C_{1x}$ and $R_{2x}$, $L_{2x}$, $C_{2x}$. The differential transformer T2' is provided with an auxiliary winding. This auxiliary winding, in the manner of a forked circuit, serves together with a resistor $R_G$ to join together into a single current the elevation- or depression-producing currents flowing through the two differential transformers T2', T3, while keeping the current of each differential transformer independent of that of the other.

The organization of the tunable stages into two or more groups can be of advantage when it is necessary to employ a larger number of tunable stages the differential capacitors of which have markedly differing capacitance values. When any one of the differential capacitors is in its middle or balance setting, there is exhibited between the two stator terminals of the differential capacitor a capacitance corresponding to the series connection of the two component capacitance values of the differential capacitor, and this capacitance has an effect upon the remainder of the compensating circuit even at frequencies outside the resonant frequency range of the associated tunable stage. As a result, if countermeasures are not taken, such series capacitance at the stator terminals of one differential capacitor has the effect of reducing the maximum magnitude of the elevation or depression settable using the tunable stages associated with resonant frequencies higher than those of the stage in question. In the embodiment of FIG. 2, this effect is counteracted by the division of the tunable stages into two groups and the association therewith of the two differential transformers. A larger number of forking transformers could be employed if it is desired to organize the tunable stages into three or more groups.

Figure 3:
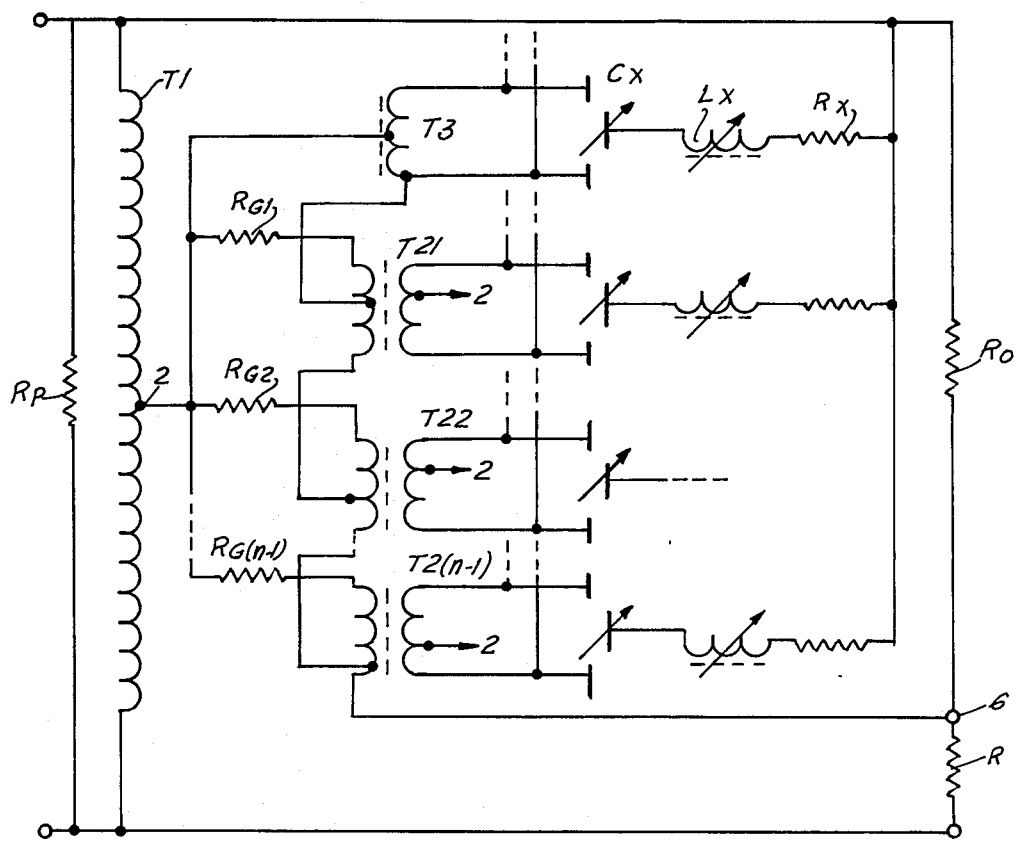

FIG. 3 depicts an embodiment in which the tunable stages are arranged in $n$ groups. The compensating circuit of FIG. 3 includes $n-1$ differential transformers T21 to T2($n-1$), each provided with a respective auxiliary winding for combining together the elevation or depression-producing currents from the tunable stages of the associated group of tunable stages. Of the tunable stages in each group of tunable stages in FIG. 3, only one tunable stage is shown. However, it will be understood that the other tunable stages in each group of stages are connected in parallel in the same manner as the tunable stages in each group of such stages in FIG. 2. The first differential transformer T3 does not require an auxiliary winding.

Figure 4:
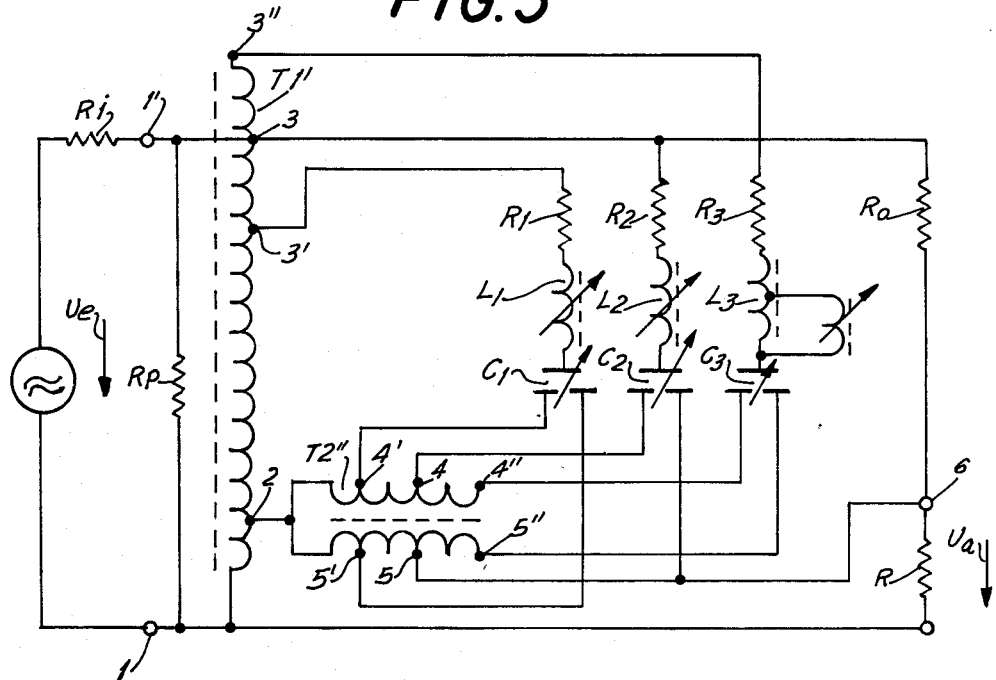

FIG. 4 depicts a compensating circuit constituting a modification of that of FIG. 1. In FIG. 4, the differential transformer T2″ is provided with taps 4′, 4 and 5′, 5, in addition to the end terminals 4″, 5″. These taps are then connected to the stator terminals of different ones of the differential capacitors $C_x$. Whereas in FIG. 1 the left stator terminals of all differential capacitors were connected in common to transformer terminal 4, and the right terminals in common to transformer terminal 5, in FIG. 4 the left stator terminals of differential capacitors $C_1$, $C_2$, $C_3$ are respectively connected to the transformer terminals 4′, 4, 4″ and the right stator terminals are respectively connected to the transformer terminals 5′, 5, 5″. This expedient makes for a very advantageous transformation of the effective capacitance values of the several differential capacitors Differential capacitors of the type in question may be available with only a limited range of capacitance values, whereas the required middle frequencies and frequency ranges for the needed elevations and depressions in the frequency response curve of the compensating circuit may call for the use of differential capacitors having very large or small capacitance values. The connection of the several differential capacitors to different respective points of the differential transformer T2″ makes possible transformation of the effective capacitance values of these capacitors into the required capacitance ranges. The capacitance values of the differential capacitors $C_x$ can also be adjusted through the use of padder capacitors $C_{Sx}$, these being employed in the embodiment of FIG. 1.

Variable inductors of simple construction usually cannot be produced in actual practice except when relatively low inductance values are involved, for example when the inductance values involved are so low as to permit the use of a core slidable through a cylindrical coil. Accordingly, if needed, the invention contemplates providing the adjustable inductor $L_x$ with an auxiliary transformer for the purpose of transforming the inductance of the adjustable inductor into the requisite inductance range. This is shown with respect to $L_3$ in FIG. 4.

Figure 5:
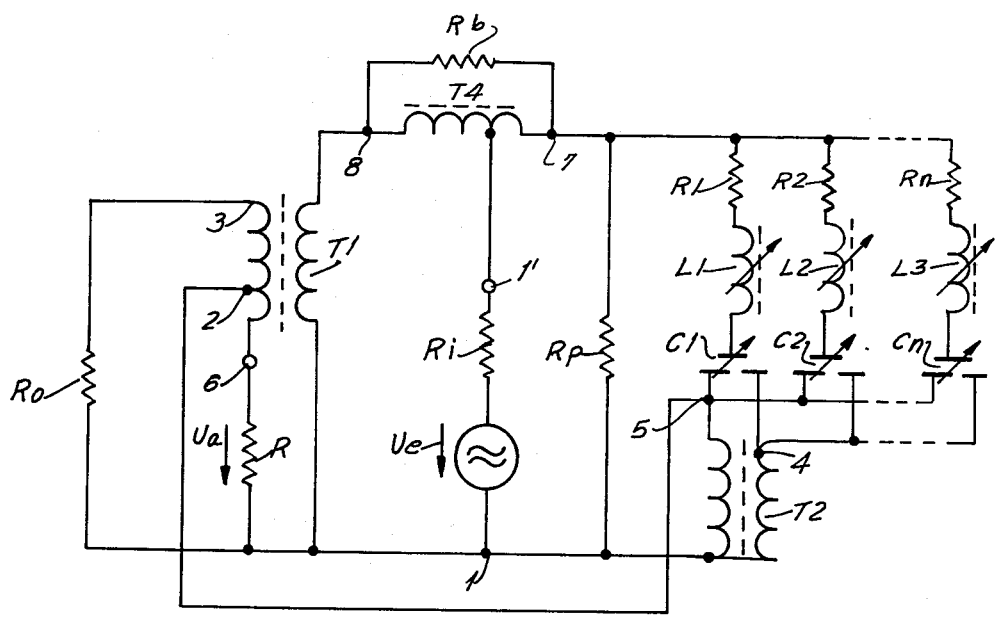

FIG. 5 depicts a compensating circuit constituting a modification of that of FIG. 1. The compensating circuit of FIG. 5 includes an additional forking transformer T4 and a bridging resistor $R_b$ connected across the end terminals 7, 8 of the latter. The input signal voltage $U_e'$ is applied to the tap 1′ of the forking transformer T4. The auxiliary loading resistor $R_p$ is connected between one end terminal 7 of transformer T4 and the circuit reference terminal 1. Also connected to the end terminal 7 of transformer T4 are the several tunable stages $R_x$, $L_x$, $C_x$. As in FIG. 1, the left stator terminals of all differential capacitors $C_x$ are connected in common to one end terminal 5 of differential transformer T2, whereas the right stator terminals of all differential capacitors $C_x$ are connected in common to the other end terminal 4 of differential transformer T2. End terminal 5 is additionally connected to the tap 2 of the input transformer T1. End terminal 3 of transformer T1 is connected to circuit reference terminal 1 via resistor $R_o$, whereas end terminal 6 of transformer T1 is connected to the circuit reference terminal 1 via output resistor R. The other winding of transformer T1 is connected between end terminal 8 of forking transformer T4 and circuit reference terminal 1.

The compensating circuit of FIG. 5 is particularly suitable for applications where a low base attenuation is needed, i.e., where the compensating circuit is to introduce little or almost no attenuation when all its differential capacitors are in the balanced setting. As explained above, In FIG. 1 the impedances of the resonant circuits are connected in parallel to the frequency-independent input impedance and they produce at each of the respective resonance frequencies a diminution of the total effective input impedance at such frequencies. This effect increases if the magnitude of the elevation or depression in the frequency response curve is kept constant but the base attenuation decreases, because the resistances $R_x$ must be made smaller. Furthermore, already at the input of the compensating circuit, there is exhibited a frequency response curve with attenuation elevations or depressions; although the compensating circuit can of course be adjusted to compensate for such attenuation elevations or depressions, the result of such initial compensation is to limit the maximum magnitude of the elevations or else of the depressions which can be subsequently introduced by resort to the compensating circuit. In the compensating circuit of FIG. 5, the frequency dependent load fluctuations produced by the resonant circuits at the terminals 7, 1 are not transmitted along the main transmission path from the terminals 1, 1′ to the terminals 1, 6, because the forking transformer T4 acts as a decoupling means.

It will be understood that each of the elements described above, or two or more together, may also find a useful application in other types of circuits and constructions differenting from the types described above.

While the invention has been illustrated and described as embodied in compensating circuits, it is not intended to be limited to the details shown, since various modifications and structural changes may be made without departing in any way from the spirit of the present invention.

In particular the circuits disclosed herein have been referred to as compensating circuits, indicating that the frequency response curve of an input circuit is to be compensating or equalized. However, the inventive circuits are likewise to be used whenever it is desired, for whatever reason, to boost or suppress certain portions of the frequency response of the input circuit for reasons not involving equalization of unequalized frequency response curves.

Without further analysis, the foregoing will so fully reveal the gist of the present invention that others can, by applying current knowledge, readily adapt it for various applications without omitting features, from the standpoint of prior art, fairly constitute essential characteristics of the generic or specific aspects of this invention.

What is claimed as new and desired to be protected by Letters Patent is set forth in the appended claims.

1. A compensating circuit, comprising, in combination, input terminals for connection to a signal source; an output impedance; input transformer means connecting the input terminals to the output impedance for applying to the latter a voltage derived from the signal applied to the input terminals; a plurality of tunable circuit stages each operable for introducing an accentuation or deaccentuation into a respective portion of the frequency response curve of the compensating circuit, each tunable stage including a differential capacitor having a rotor terminal, a first stator terminal and a second stator terminal, each tunable stage furthermore including a resistor and an inductor connected in series with each other and to the rotor terminal of the differential capacitor of the stage; differential transformer means comprised of first and second winding means respectively connected to the first and second stator terminals and connected to the output impedance for applying thereto a supplemental voltage derived from the voltage induced across the differential transformer means and dependent upon the settings of the differential capacitor.

2. The compensating circuit of claim 1, the input transformer means being comprised of a transformer having two winding sections of turns numbers W1 and W2, the compensating circuit further including a voltage divider comprised of two resistors of resistance R and $R_o$ connected across the input terminals, the resistor of resistance R constituting the aforementioned output impedance, the ratio W1/W2 being equal to $R_o/R$, the differential transformer means being comprised of a differential transformer having a first winding and a second winding, the first winding and second winding being each connected at one end to the junction between the two winding sections of the input transformer, the first stator terminals of the differential capacitors being connected in common to the other end of the first winding of the differential transformer, the second stator terminals of the differential capacitors being connected in common to the other end of the second winding of the differential transformer and to the junction between the two voltage divider resistors.

3. The compensating circuit of claim 1, the compensating circuit further including a supplemental load resistor connected across the input terminals for supplementing the input impedance presented by the remainder of the compensating circuit to a signal source connected across the input terminals of the compensating circuit and thereby make possible matching of the input impedance value of the compensating circuit to the internal impedance of such signal source.

4. The compensating circuit of claim 1, at least one of the tunable circuit stages additionally including a padding capacitor connected in series with the resistor and inductor of the stage.

5. The compensating circuit of claim 1, the input transformer means being comprised of a transformer having two winding sections of turns members W1 and W2, the compensating circuit further including a voltage divider comprised of two resistors of resistance R and $R_o$ connected across the input terminals, the resistor of resistance R constituting the aforementioned output impedance, the ratio W1/W2 being equal to $R_o/R$, the differential transformer means being comprised of two differential transformers each comprised of a first winding and a second winding, the first and second winding of each differential transformer being connected at one end to the junction between the two winding sections of the input transformer, the plurality of tunable circuit stages comprising two groups of such tunable circuit stages, the first stator terminals of the differential capacitors of each group of tunable circuit stages being connected in common to the other end of the first winding of one respective differential transformer and the second stator terminals of the differential capacitors of the same group being connected in common to the other end of the second winding of the respective differential transformer, the differential transformer means further including an auxiliary winding inductively coupled to one of the windings of one differential transformer and electrically connected to one of the windings of the other differential transformer for developing a voltage across the auxiliary winding composed of a component dependent upon the voltage induced across one differential transformer and a component dependent upon the voltage induced across the other differential transformer, one end of the auxiliary winding being connected to the junction between the winding sections of the input transformer, the other end of the auxiliary winding being connected to the junction between the voltage divider resistors.

6. The compensating circuit of claim 1, the input transformer means being comprised of a transformer having two winding sections of turns numbers W1 and W2, the compensating circuit further including a voltage divider comprised of two resistors of resistance R and $R_o$ connected across the input terminals, the resistor of resistance R constituting the aforementioned output impedance, the ratio W1/W2 being equal to $R_o/R$, the differential transformer means being comprised of $n$ differential transformers each comprised of a first winding and a second winding, the first and second winding of each differential transformer being connected at one end to the junction between the two winding sections of the input transformer, the plurality of tunable circuit stages comprising $n$ groups of such tunable circuit stages, the first stator terminals of the differential capacitors of each individual group of tunable circuit stages being connected in common to the other end of the first winding of one respective differential transformer and the second stator terminals of the differential capacitors of the same group being connected on common to the other end of the second winding of the respective differential transformer, the differential transformer means additionally including $n-1$ auxiliary windings each coupled inductively to a respective one of $n-1$ of the $n$ tunable circuit stages, each auxiliary winding section having first and second terminals and an intermediate tap, the first terminal of each of the $n-1$ auxiliary windings being connected to the junction between the winding sections of the input transformer, the tap of the first one of the $n-1$ auxiliary windings being connected to the end terminal of one of the windings of the differential transformer not provided with any auxiliary winding, the tap of each of the remaining $n-2$ of the $n-1$ auxiliary windings being connected to the second terminal of a different respective one of the $n$-1 auxiliary windings, one of the auxiliary windings having its second terminal connected not to the tap of another auxiliary winding but instead to the junction between the voltage divider resistors.

7. The compensating circuit of claim 1, the input transformer means being comprised of a transformer having two winding sections of turns numbers W1 and W2, one of the winding sections being provided with a plurality of terminals spaced along its length, the compensating circuit further including a voltage divider comprised of two resistors of resistance R and $R_o$ connected across the input terminals, the resistor of resistance R constituting the aforementioned output impedance, the ratio W1/W2 being equal to $R_o/R$, the differential transformer means being comprised of a differential transformer having a first winding and a second winding, the first winding being provided with first terminals spaced along its length, the second winding being provided with corresponding second terminals spaced along its length, the first winding and second winding being each connected at one end of the junction between the two winding sections of the input transformer, the first stator terminals of the differential capacitors being connected to different respective ones of the first terminals of the differential transformer and the second stator terminals of the differential capacitors being connected to corresponding ones of the second terminals of the differential transformer, the series connection of the resistor and inductor of each of the tunable circuit stages being connected at the end thereof not connected to the associated rotor terminal to a respective one of the terminals of said one of said winding sections of the input transformer.

8. The compensating circuit of claim 1, the compensating circuit further including decoupling means for decoupling the input transformer means and output impedance from the plurality of tunable circuit stages.

9. The compensating circuit of claim 8, the decoupling means comprising a decoupling transformer having two end terminals and an intermediate tap, the intermediate tap being connected to one of the input terminals of the compensating circuit, the input transformer being connected between one end terminal of the decoupling transformer and the other input terminal of the compensating circuit, the combination of the plurality of tunable circuit stages and the differential transformer means being connected between the other end terminal of the decoupling transformer and said other input terminal of the compensating circuit, the decoupling means further including a resistor connected between the two end terminals of the decoupling transformer.

* * * * *